United States Patent Office 3,014,012
Patented Dec. 19, 1961

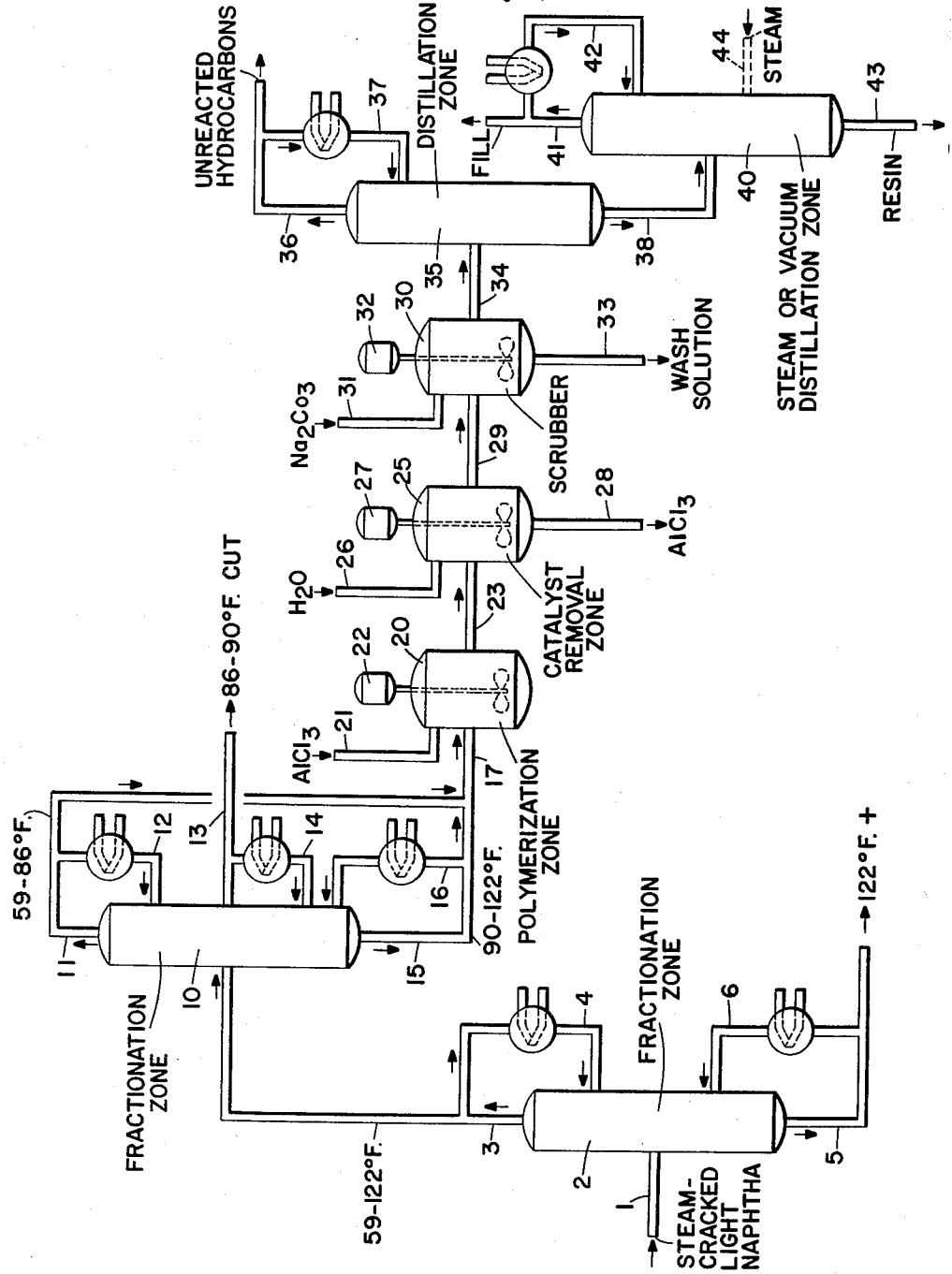

3,014,012
REMOVAL OF 2-METHYL BUTENE-1 FROM PETROLEUM RESIN FEEDS
John B. Riley, Westfield, and Howard T. Oakley, Elizabeth, N.J., assignors to Esso Research and Engineering Company, a corporation of Delaware
Filed May 8, 1958, Ser. No. 734,055
11 Claims. (Cl. 260—82)

This invention relates to the preparation of improved petroleum resins from steam-cracked petroleum streams. More particularly, it relates to the process for preparing resins from steam-cracked light naphtha streams containing substantial amounts of $C_5$ components, wherein the resin quality is improved by removing the 2-methyl butene-1 from the stream-cracked resin feeds.

Until now, the petroleum resins of the type described herein have been produced largely from the steam-cracked heavier petroleum fractions boiling in the range of about 250° to 700° F., such as heavy naphtha, kerosene, gas oil, and the like. These heavier fractions are cracked in the presence of 50–90 mol percent steam at temperatures of about 1000° to 1500° F. to give highly unsaturated products. The liquid cut boiling from about 60° F. up to 400° F. and higher, containing large proportions of $C_5$ to $C_9$ olefins and diolefins, is then polymerized over a Friedel-Crafts catalyst to produce the desired petroleum resins. The preparation of such resins has been described in U.S. Patent 2,734,046.

More recently, however, light naphthas have been used frequently as steam-cracking feed stocks in place of the heavier naphthas, gas oils and the like. While the steam cracking of such light naphthas has been quite successful in producing ethylene, butadiene, and the like, there has been considerable difficulty in the satisfactory preparation of petroleum resins from the $C_5$–250° F. fraction obtained from such steam-cracked light naphthas. These difficulties have been alleviated by following the procedures described in application Serial No. 627,090. That is, resin production may be improved by steam-cracking a light naphtha boiling from about 120° to 350° F., and subjecting the steam-cracked fraction boiling from about 60° F. up to about 120° F., i.e. the initial boiling point of the light virgin naphtha, to polymerization. However the softening point of the resins produced from the steam-cracked light naphthas are still rather low in comparison to the resins produced from the steam-cracked heavier fractions.

It is the chief object of this invention to produce resins having softening points higher than have been heretofore possible, from steam-cracked distillates largely comprising $C_5$ components. It is a more specific object to upgrade the $C_5$ or $C_5$–$C_6$ fraction obtained from a steam-cracked light naphtha in order to polymerize it into high quality petroleum resins. These and other objects will become more clearly apparent from the following description of the nature, scope, and operation of the invention.

It should be understood that all ratios, proportions, and percentages are expressed throughout on a weight basis, unless otherwise indicated.

It has now been found that the softening point of the petroleum resin prepared from steam-cracked fractions containing high proportions of $C_5$ components may be substantially increased without serious loss in yield by removing substantially all of the 2-methyl butene-1 from the feed fraction. This removal may be brought about by fractionally distilling off a close fraction containing the 2-methyl butene-1 which boils normally at 88° F. For example, the 86° to 90° F. cut will normally contain substantially all of the 2-methyl butene-1. The fraction removed may be passed over a dehydrogenation catalyst, converting the 2-methyl butene-1 to isoprene, piperylene, and other more highly unsaturated hydrocarbons, which may be added back to the resin feed to further increase resin yield and softening point. Alternatively, instead of fraction distillation, the entire $C_5$-containing fraction may be passed over the dehydrogenation catalyst.

The present invention is adaptable and advantageous to processes for preparing resins from any petroleum fraction containing substantial proportions of 2-methyl butene-1, but the invention is most especially advantageous to the preparation of resins from steam-cracked light naphthas, since, as seen in Serial No. 627,090, the most suitable resin-producing fraction available in such cracked naphthas is the $C_5$ or $C_5$–$C_6$ cut. Therefore a more thorough study of such cracked naphtha feeds in comparison with steam-cracked fractions having lower $C_5$ contents will aid in the better understanding of this invention. The composition of a typical $C_5$ steam cracked naphtha cut is represented below by a 60°–120° F. cut of a steam-cracked Kuwait light naphtha, which, before cracking, boils from about 120° to 220° F. This steam-cracked naphtha cut is compared with a typical resinification feed comprising a 100°–248° F. cut from a steam-cracked gas oil.

TABLE I

| Component | $C_5$ cut steam-cracked Kuwait light naphtha, weight percent | 100°–248° F. cut of steam-cracked gas oil weight percent |
|---|---|---|
| $C_5$ cut: | | |
| Isoprene | 7.7 | 0.3 |
| Piperylene | 6.1 | 9.8 |
| Cyclopentadiene | 3.3 | 0.3 |
| Total diolefins | 17.1 | 10.4 |
| Pentene-1 | 18.4 | nil |
| Pentene-2 | 15.7 | 1.8 |
| 2-Methyl butene-1 | 14.4 | nil |
| 3-Methyl butene-1 | 1.2 | nil |
| 2-Methyl butene-2 | 6.5 | 2.5 |
| Cyclopentene | 3.2 | 2.9 |
| Total olefins | 59.4 | 7.2 |
| Total paraffins | 23.3 | 2.0 |
| Total $C_5$ cut | 100 | 19.6 |
| Total $C_6$ cut | 0 | 22.6 |
| Total $C_7$ cut | 0 | 44.2 |
| Total $C_8+$ cut | 0 | 13.6 |

Cyclodienes have been substantially removed from both of the fractions shown in Table I. It is observed that 14.4% of the $C_5$ steam-cracked light naphtha fraction consists of 2-methyl butene-1, whereas only negligible amounts of that component are present in a typical resin feed obtained from a steam-cracked gas oil. Thus, the adverse effects of the 2-methyl butene-1 are much greater in the steam-cracked light naphtha cut, and removal of the component gives a significantly improved resin.

In one embodiment of this invention, a $C_5$ steam-cracked light naphtha stream boiling from about 60° to 120° F. is passed through a fractional distillation tower, and a fraction boiling between 86° and 90° F. is separated from the $C_5$ stream. The remaining $C_5$ stream comprises the feed to the polymerization zone.

The polymerization is carried out at temperatures between $-40°$ to $+160°$ F., preferably at 75° to 110° F., using about 0.25 to 3%, preferably 1 to 1.5% of a Friedel-Crafts catalyst based on cracked naphtha being treated. The catalyst may be used either as a finely divided solid, or as a solution in methyl or ethyl chloride, or as a hydrocarbon slurry, etc. For instance, the polymerization may be effected by adding 1% powdered $AlCl_3$ to the fraction to be polymerized and maintaining the mixture at 95° F. for two hours. The polymerization is usually carried out at atmospheric pressure, but at the higher temperatures it is desirable to increase the pressure sufficiently to keep the monomers in the liquid phase. Accordingly, when polymerizing at 160° F. a pressure of about 5 atmospheres is desirable. Upon completion of the reaction the catalyst is destroyed by adding water or methyl alcohol or the like. The catalyst and quenching medium is separated from the resin-containing hydrocarbon solution and the resin solution washed with water, caustic, an aqueous solution of sodium carbonate or the like. The resin raffinate or stabilized naphtha is next distilled from the resin solution at atmospheric pressure and the remaining fill material is finally removed by vacuum distillation. The desired hydrocarbon resin constitutes the bottoms from this final distillation. The yield and softening point are largely dependent upon the severity of this final stripping step, with the yield decreasing and the softening point increasing with increasing severity of stripping.

The fraction boiling between about 86° and 90° F. may be recovered from the fractional distillation zone and passed to a dehydrogenation stage. In such a stage, the fraction is contacted with a metal oxide dehydrogenation catalyst such as iron oxide, magnesium oxide, and the like, at temperatures of about 1100° to 1225° F., preferably 1200° to 1225° F., for contact times sufficient to convert substantially all of the 2-methyl butene-1 to isoprene, e.g. usually about 10 to 35 seconds. The total dehydrogenated fraction may be charged to the polymerization zone to increase the resin yield, or the isoprene may be first separated from the dehydrogenated fraction by fractional distillation for use in other manufacturing processes and the remaining components charged to the polymerization zone. If isoprene is charged to polymerization, not only is the resin yield increased, but the softening point as well.

Alternatively, under controlled conditions, the entire steam-cracked fraction may be subjected to dehydrogenation, thereby eliminating the fractional distillation step. The dehydrogenated product would be enriched in isoprene thereby leading to the production of resins of higher softening point.

A specific embodiment of the invention will now be described with reference to the attached diagram. The fraction boiling above 59° F. of a steam-cracked light naphtha stream is introduced by line 1 into fractional distillation tower 2. The fraction boiling up to 122° F. is removed overhead via line 3, a portion of this overhead stream being returned to still 2 as reflux via line 4. The fraction boiling above 122° F. is withdrawn as bottoms via line 5 and is recycled in part via line 6. Alternatively, tower 2 may be operated so as to recover several side-stream cuts boiling above 122° F., such as a 122°–168° F. cut and a 169°–194° F. cut, leaving a 194°+ cut as bottoms.

It is often desirable to dimerize by heat soaking and remove by distillation the cyclodienes present in the cracked distillate. In the present invention, this step could be performed upon the initial 59° F.+ fraction or, upon the separated 59°–122° F. fraction. This heat-soaking procedure, e.g., at 220° F. for 5 hours, to dimerize cyclopentadienes, is described fully in U.S. Patent 2,734,046. The presence of cyclodienes, as stated previously, tends to degrade somewhat the resin color and stability.

The 59°–122° F. fraction is passsed to a second fractionation tower 10, where the fraction boiling between 59° and 86° F. is recovered overhead via line 11. Part of the 59°–86° F. cut is returned as reflux via line 12. A side-stream fraction boiling from 86° to 90° F. is withdrawn via line 13, part of this stream also being returned as reflux via line 14. The bottoms cut boiling from 90° to 122° F. is withdrawn through line 15, with a portion being returned to tower 10 via line 16. The overhead 59°–86° cut and the bottoms 90°–122° cut are combined and passed via line 17 to polymerization zone 20.

The 86°–90° F. side-stream cut contains substantially all of the 2-methyl butene-1 present in the initial feed to tower 2. If desired, this narrow boiling fraction may be subjected to dehydrogenation to convert the 2-methyl butene-1 to isoprene and other diolefins. The resulting stream may be combined with the polymerization feed in line 17, or the isoprene may be recovered and purified for use in other valuable operations.

The polymerization is conducted in reactor 20 at a temperature between 75° and 110° F. in the presence of 0.5 to 2% aluminum chloride catalyst, the catalyst being introduced via line 21. Agitation is provided by stirrer 22, and the residence time in the reactor is about 1 to 3 hours. The resulting admixture is passed via line 23 to tank 25 where the residual catalyst is quenched at 180° to 220° F. by the addition of water containing a non-ionic wetting agent through line 26. Agitation is provided by stirrer 27. Catalyst is removed in the aqueous phase via line 28 and the reaction mixture is passed via line 29 to scrubber 30. A 10% aqueous solution of 10 wt. percent $Na_2CO_3$ is passed into scrubber 30 via line 31, and agitation is provided by stirrer 32 at 300° to 360° F. The aqueous phase is removed via line 33, and the scrubbed resin solution is passed via line 34 to atmospheric distillation column 35.

In column 35, the reaction mixture is distilled to a liquid temperature of about 350° to 400° F. to strip the unreacted hydrocarbons from the mixture via line 36. A portion of these unreacted hydrocarbons is recycled as reflux via line 37. The crude resin solution is then passed via line 38 to vacuum or steam distillation tower 40, where, at conditions of or equivalent to a top temperature of 480° to 520° F. at 2–10 mm. Hg, the liquid polymer or "fill" is stripped overhead via line 41, with a portion being refluxed via line 42, and the finished resin is recovered as bottoms from line 43. If steam is employed, the steam is introduced via line 44. The softening point of the final resin is largely dependent, up to certain limits, upon the severity of this final stripping step.

The invention will be further illustrated, but not limited, by the following examples.

*Example 1*

A blend of $C_5$–$C_6$ steam-cracked petroleum fractions, having an initial boiling point of 60° F. and from which the cyclodienes had been substantially removed following a dimerization step, had the following composition:

TABLE II

| Component: | Weight percent |
|---|---|
| Isoprene | 12.2 |
| Piperylene | 4.3 |
| Cyclopentadiene | 1.2 |
| Total diolefins | 17.7 |
| Pentene-1 | 16.8 |
| Pentene-2 | 12.8 |
| 2-methyl butene-1 | 12.9 |
| 3-methyl butene-1 | 5.9 |
| 2-methyl butene-2 | 6.5 |
| Cyclopentene | 4.7 |
| Total olefins | 59.6 |
| Isopentane | 0.4 |
| n-Pentane | 0.5 |
| 2-methylpentane | |
| Total paraffins | 0.9 |
| $C_6$+ components | 21.9 |

The above analysis shows that the olefin-diolefin ratio of the above blend was about 3.4, and that, with respect to the $C_5$ components, the composition of the blend was almost identical to that of the typical steam-cracked Kuwait light naphtha shown hereinbefore.

RUN A

A 200 gram portion of the above blend was admixed with 2 grams (1 wt. percent) of aluminum chloride and charged to a 1 liter round bottom flask. The admixture was maintained for two hours in the flask at 95° F. The reaction mass was then quenched by adding 20 ml. (10 vol. percent) of a solution of 1 wt. percent Ethofat, a non-ionic wetting agent, in distilled water, and stirring the mixture for about 30 minutes at 95° F. The aqueous phase was decanted off, the remaining mixture was agitated with 20 ml. (10 vol. percent) of 10 wt. percent sodium carbonate, and the aqueous phase was removed. The crude resin solution was charged to a one liter Claisen flask equipped with a thermometer, and the solution was distilled to 392° F. liquid temperature at atmospheric pressure. The overhead resin raffinate was discarded, and the remaining resin solution was then distilled to 518° F. liquid temperature at 5–6 mm. Hg. The flask containing the finished resin was weighed for yield determinations while still hot, after the vacuum had been released. The overhead liquid polymer or "fill" material was recovered and weighed. The hot, finished resin was poured into a heated ring for softening point determination.

RUN B

In a second run, a 254 gram portion of the above blend was charged to a 30 plate Oldershaw column and fractionally distilled to 90° F. at atmospheric pressure. The fraction boiling from the initial boiling point to 90° F. was withdrawn overhead, and the remaining 90° F.+ fraction, amounting to 130 grams, was recovered as bottoms. This bottoms fraction was polymerized in the same manner and under the same conditions, described in the preceding paragraph. The results of the two polymerizations are compared in Table III below:

TABLE III

| Run No. | 1[a] | 2 |
| --- | --- | --- |
| Feed | Total fraction | 90° F.+fraction. |
| Total resins, gms | 85 | 77. |
| Resin yield, weight percent based on feed | 40–45 | 59. |
| Liquid polymer, weight percent based on feed | 10 | 7. |
| Softening point, ° C.[b] | 70–75 | 103. |
| Color [c] | 9–10 | 9. |

[a] Average of several runs.
[b] Ring and Ball, ASTM E-28-51T.
[c] Gardner, 20 wt. % resin in xylene.

It is seen that, by removing the fraction boiling up to 90° F. from the resin feed, the yield and especially the softening point of the resulting resin are greatly increased. This 60°–90° F. fraction was analyzed as follows:

TABLE IV

| Component: | Weight percent |
| --- | --- |
| Isoprene | 20.0 |
| Piperylene | 1 |
| Cyclopentadiene | 1 |
| 2-methyl butene-1 | 23.8 |
| Olefins (other) | 50.7 |
| Cyclic olefins | 2 |
| Saturates | 1.5 |
|  | 100.0 |

Example 2

In order to substantiate the conclusion that it is the 2-methyl butene-1 component in a $C_5$ resin feed which causes the formation of low softening point resins, the following run was made. A 130 gram portion of the 90° F.+ fraction of the steam-cracked $C_5$ blend described in Example 1 was admixed with 20 grams of 2-methyl butene-1. The resulting fraction therefore contained 13.3 wt. percent 2-methyl butene-1, which closely approximates the proportion of this component in the total $C_5$ blend polymerized in Example 1, Run A. The prepared fraction was polymerized in the same manner as in the previous runs, and the results were as follows:

TABLE V

| | |
| --- | --- |
| Total resin, grams | 75.8 |
| Resin yield, weight percent based on feed | 50.5 |
| Liquid polymer, weight percent based on feed | 10.9 |
| Softening point ° C.[a] | 77 |
| Color [b] | 10.5 |

[a] See footnote b, Table III.
[b] See footnote c, Table III.

The softening point has been lowered to the level observed in Example 1, Run A, indicating beyond a doubt, that it is the 2-methyl butene-1 that is the degrading, undesirable component in the resin feeds.

Example 3

A steam-cracked gas oil having an initial boiling point of 100° F. and having the composition of the typical steam-cracked gas oil set forth hereinbefore in Table I was isolated. The effect of various individual $C_5$ olefins upon the resin softening point is illustrated in Table VI. The polymerization conditions for each run were the same as in the previous examples.

TABLE VI

| Run | A | B | C | D | E | F |
| --- | --- | --- | --- | --- | --- | --- |
| Feed | (1) | (1) | (1) | (1) | (1) | (1). |
| Olefin added | None | 2-methyl butene-1 | 2-methyl butene-1 | Pentene-1 | Pentene-2 | 2-methyl butene-2. |
| Weight percent olefin added [a] | | 10 | 20 | 20 | 20 | 20. |
| Resin yield [a] | 35.6 | 36.0 | 33.3 | 29.8 | 27.4 | 26.6. |
| Liquid polymer [a] | 4.3 | 6.6 | 11.1 | 3.6 | 5.0 | 6.8. |
| Softening point ° C.[b] | 87.0 | 71.0 | 57.0 | 84.5 | 93.0 | 96.0. |

[1] 100°–248° F. steam-cracked gas oil.
[a] Weight percent based on total charge.
[b] See footnote b, Table III.

This example conclusively illustrates that 2-methyl butene-1 is more harmful to resin softening point than other $C_5$ olefins. Furthermore, the example shows that the adverse effect of 2-methyl butene-1 increases with the amount present in the resin feed.

Example 4

A $C_5$ olefinic steam-cracked fraction, containing 27.3% 2-methyl butene-1, 0.4% isoprene, and 0.2% piperylene was dehydrogenerated at 1143° F. in the presence of the Shell 105 catalyst (85–90% $Fe_2O_3$, 5–8% $K_2CO_3$, 5% $Cr_2O_3$). The resulting product contained 10.1% isoprene, 12.4% piperylene, and only 13.3% 2-methyl butene-1. This shows that fractions containing 2-methyl butene-1 may be dehydrogenated to convert the undesirable $C_5$ olefin largely to isoprene, which is a desirable compound both in resin feeds and for other uses. Accordingly, it is contemplated as a part of this invention to dehydrogenate the fraction containing the 2-methyl butene-1, and to admix the resulting dehydrogenated product with the resin reed.

It is quite apparent by now that 2-methyl butene-1 is a harmful component in any steam-cracked resin feed-gas oils, naphthas, and the like. The harmful effect is most noticeable when steam-cracked light naphthas are employed as the resin feeds. It should be further understood that other modifications of the present invention will be obvious to those skilled in the art.

Having set forth the general nature and illustrative embodiments of the invention, the true scope is now particularly pointed out in the appended claims.

What is claimed is:

1. A process for preparing petroleum resins which comprises separating a fraction containing 2-methyl butene-1 from a steam-cracked petroleum distillate rich in $C_5$ unsaturated hydrocarbons and boiling 59°–122° F. including 2-methyl butene-1, and polymerizing the remaining portion of said distillate over a Friedel-Crafts catalyst to obtain a high softening point resin.

2. A process for preparing petroleum resins which comprises passing a steam-cracked petroleum distillate rich in $C_5$ unsaturated hydrocarbons boiling 59°–122° F. including 2-methyl butene-1 into a fractional distillation zone, withdrawing from said distillation zone a fraction containing the 2-methyl butene-1, contacting the remaining fractions, substantially free of 2-methyl butene-1, with a Friedel-Crafts catalyst at a temperature of −40° to 160° F., and recovering the resulting high softening point petroleum resin.

3. In a process for preparing petroleum resins wherein a steam-cracked petroleum distillate rich in $C_5$ unsaturated hydrocarbons boiling 59°–122° F. including 2-methyl butene-1 is contacted with a Friedel-Crafts polymerization catalyst at temperatures of −40° to 160° F., the improvement which comprises fractionally distilling said distillate prior to polymerization to remove the fraction containing substantially all of the 2-methyl butene-1, and polymerizing the remaining fractions in the presence of said Friedel-Crafts polymerization catalyst to produce petroleum resins of higher softening points.

4. A process according to claim 3 wherein the steam-cracked petroleum distillate is a steam-cracked light naphtha distillate.

5. A process for preparing petroleum resins which comprises passing a $C_5$–$C_6$ steam-cracked petroleum fraction boiling 59°–122° F. containing 2-methyl butene-1 into a fractional distillation zone, distilling said fraction to remove an intermediate cut containing substantially all of the 2-methyl butene-1, passing the remaining cuts in admixture to a polymerization zone, contacting said admixture with 0.25 to 3 wt. percent of aluminum chloride at a temperature from −40° to 160° F., quenching and removing said aluminum chloride from the resulting resin solution, distilling unreacted hydrocarbons from the resin solution in an atmospheric distillation zone, distilling liquid polymer from said resin solution in a vacuum distillation zone, and recovering the high softening point resin as bottoms from said vacuum distillation zone.

6. A process according to claim 5 wherein said intermediate cut boils from 86° to 90° F.

7. A process according to claim 5 wherein said intermediate cut is dehydrogenated at 1100° to 1225° F. in the presence of a metal oxide dehydrogenation catalyst, and the dehydrogenated product is polymerized with said admixture.

8. A process for preparing petroleum resins which comprises passing a steam-cracked light naphtha fraction boiling from 59° to 122° F. and containing 2-methyl butene-1 into a fractional distillation zone, fractionally distilling said steam-cracked naphtha to segregate a cut boiling between about 86° and 90° F. and containing substantially all of the 2-methyl butene-1 present in said naphtha, recovering the remaining fractions from said distillation zone, passing the segregated 86°–90° F. fraction over a metal oxide dehydrogenation catalyst at a temperature between 1100° and 1225° F. to convert the 2-methyl butene-1 present therein to more unsaturated derivatives, admixing the resulting dehydrogenated product with said remaining fractions, contacting the admixture in a polymerization zone with 0.25 to 3 wt. percent of aluminum chloride at a temperature of 75° to 110° F. until a resin is formed, washing the aluminum chloride from the polymerization mixture, stripping the unreacted hydrocarbons and liquid polymer from said polymerization mixture, and recovering the remaining high softening point resin.

9. A process according to claim 8 wherein said steam-cracked light naphtha fraction is heat-soaked to dimerize substantially all of the cyclodienes present therein, then stripped to separate an overhead product from the dimerized cyclodienes, and said overhead product is then passed to said fractional distillation zone.

10. A process for preparing petroleum resins which comprises isolating a steam-cracked petroleum distillate boiling largely above 59° F. and containing 2-methyl butene-1, separating said steam-cracked distillate into a fraction boiling 59 to 86° F., a fraction boiling 86 to 90° F. containing the 2-methyl butene-1 and a fraction boiling above 90° F., mixing the 59 to 86° F. fraction with the fraction boiling above 90° F. and contacting the combined stream with 0.25 to 3% of an aluminum chloride polymerization catalyst at a temperature between −40° and 160° F. and recovering the high softening point resin produced thereby.

11. A high softening point petroleum resin produced by the process which comprises providing a $C_5$–$C_6$ steam-cracked light naphtha containing 2-methyl butene-1, separating the 2-methyl butene-1 from said $C_5$–$C_6$ fraction and contacting the 2-methyl butene-1 free residue with 0.25 to 3% of a Friedel-Crafts catalyst at a temperature between −40° and 160° F. until said resin is formed.

References Cited in the file of this patent

UNITED STATES PATENTS

| | | |
|---|---|---|
| 2,750,360 | Moore | June 12, 1956 |
| 2,753,325 | Banes et al. | July 3, 1956 |
| 2,775,577 | Schneider et al. | Dec. 25, 1956 |
| 2,856,389 | Fusco et al. | Oct. 14, 1958 |